United States Patent Office 3,520,112
Patented July 14, 1970

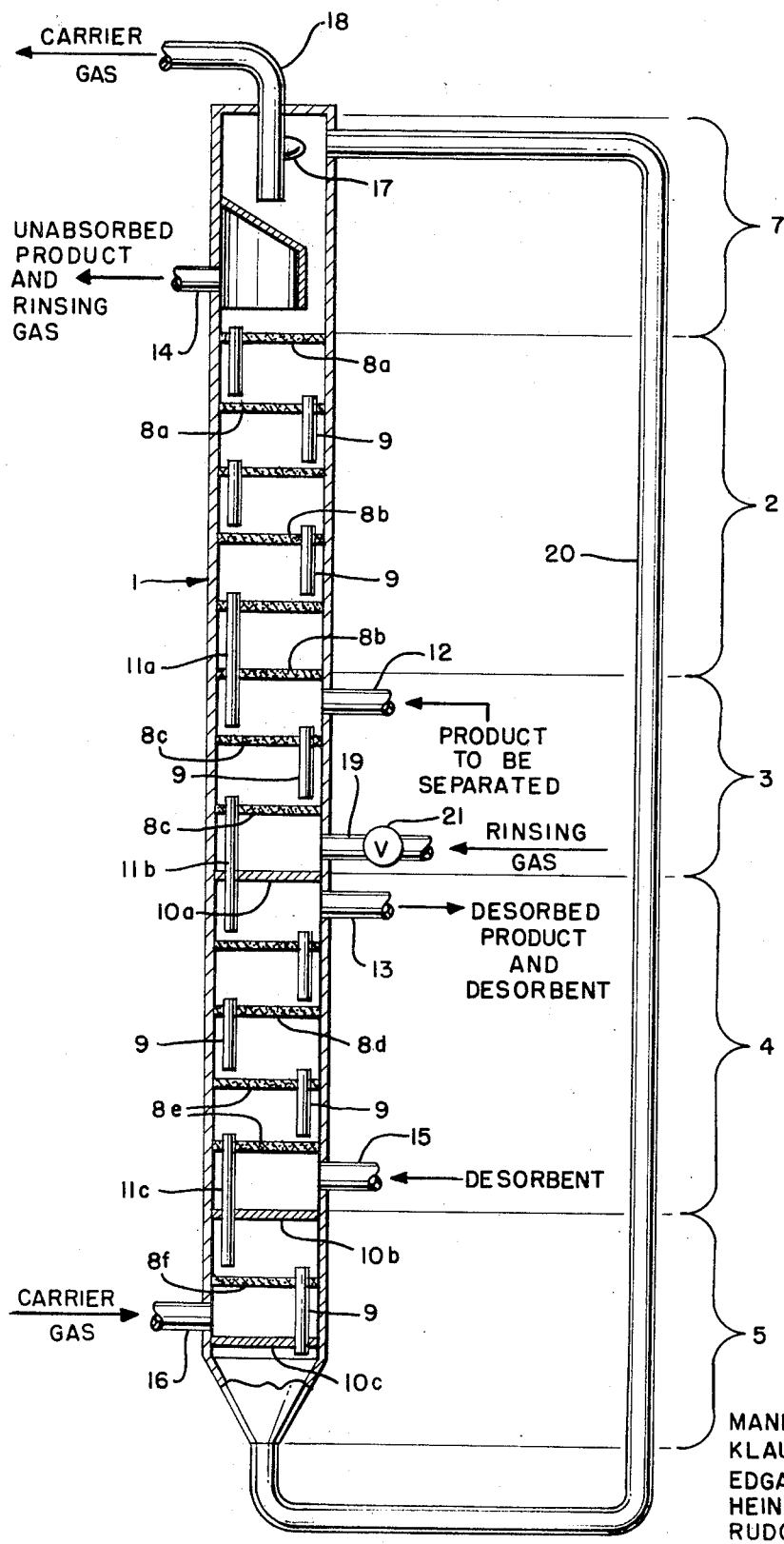

3,520,112
COLUMN FOR SELECTIVE ADSORPTION OF HYDROCARBONS FROM MIXTURES
Manfred Mittelstrass, Klaus-Dieter Arndt, Edgar Kotztin, Heinz Salomon, Rudolf Ullrich, and Rolf Tauchnitz, Magdeburg, Germany, assignors to VEB Schwermaschinenbau "Karl Liebknecht" Magdeburg, Magdeburg, Germany
Filed July 24, 1968, Ser. No. 747,135
Int. Cl. B01d 19/00
U.S. Cl. 55—196                                     3 Claims

ABSTRACT OF THE DISCLOSURE

A column for the continuous separation of hydrocarbons by seelctive adsorption with a zeolite-type adsorbent moving downward in countercurrent with the ascending, gaseous or vaporous hydrocarbons, the column comprising in superposition an adsorbent inlet zone, an adsorption zone, a desorption zone, with a rinsing zone optionally interposed between the latter two, and an adsorbent exit zone; arranged within the zones are gas-permeable transverse bottoms connected by ducts for the passage of the adsorbent in liquid-like flow, and between the zones gas-impermeable bottoms in which discharge passages are mounted which permit only a minimum of intermingling between streams of incoming and exiting products; the column further comprising inlets and outlets for the hydrocarbon mixture, for the adsorbent and the desorbent, and at the bottom an inlet for carrier gas by which the amount of circulating adsorbent is controlled.

BACKGROUND OF THE INVENTION

The invention relates to a column for the continuous separation of hydrocarbon mixtures by selective adsorption; in the column the solid adsorbent is passed in countercurrent to gas or vapor in several zones.

There are some processes known for the separation of nydrocarbon mixtures by adsorption, in which the mixtures are passed through stationary beds of selective adsorbents for such a time that the solid adsorbent will be saturated with adsorbable substances. After saturation is reached, the adsorbed components are desorbed by pressure release, or by heating, or by admission of components which will displace the adsorbed substances.

In some known processes, the adsorbent is rinsed with an inert gas before desorption, in order to remove undesired, superficially adsorbed components. If, according to the steps of adsorption, rinsing, and desorption several adsorbers with stationary beds are used, which are switched over from one operation to the other in determined, periodic intervals, that will lead to a quasi-continuous sequence of the entire process.

In addition to the processes using several adsorbers with periodic change-over, said adsorbers being equipped with stationary adsorbent-charged beds, other processes are known in which the solid adsorbent is passed in counter-current to the gas through a column divided into zones.

Both these known processes have certain disadvantages.

The first mentioned process comprising several adsorption columns or towers with periodic change-over requires considerable equipment consisting of special switching and control devices. Since, furthermore, processes for separating hydrocarbon mixtures are frequently carried out at temperatures of 300° to 500° C. with attendant pressures of up to 10 atmospheres, the adsorption towers, for instance, one tower for adsorption, one for rinsing, two for desorption, one for regeneration of the adsorbent, incur high costs for the total plant. Required are also large amounts of adsorbents for filling the several adsorbers, which add to the expenses.

These shortcomings are not inherent in the use of a column in which the adsorbent moves from top to bottom in counter-current to the gas. However, the known columns continuously operating on the counter-current principle, lead to formation of undesirable mixed phases of the product withdrawn at the transition of the several zones. These mixed phases have to be worked up separately. The known apparatus based on the counter-current principle do not possess the necessary operational accuracy for the separation of hydrocarbon mixtures by means of selective adsorbents for the several necessary zones which are impinged upon by different amounts of gas and vapors, whereby the flow of solid material remains constant in each zone.

SUMMARY OF THE INVENTION

The present invention has for its object to provide a more economical method for separating a mixture of hydrocarbons by selective adsorption which will make it possible to reduce the costs for the apparatus required and for its operation.

It is another of the present invention to provide an apparatus for the separation of hydrocarbon mixtures, for instance of straight-chain mixtures of hydrocarbons, by the known steps of adsorption, rinsing, and desorption which can be carried out with zeolites as adsorbents at the conventional temperatures of 300°–500° C. and pressures from 1 to 10 atmospheres in continuous operation, but at considerably reduced expense as compared to the known processes.

Other objects and advantages of the invention will be come readily apparent from the following detailed description and the accompanying drawing.

The above objects of the invention can be realized by providing a column which comprises an adsorption inlet zone, main adsorption zone, a desorption zone and an adsorption exit zone; if desired, a rinsing zone may be arranged between adsorption and desorption zones and extending into each of said zones, transverse gas-permeable bottoms are built which are connected by ducts over which the solid adsorbent flows in the manner of a liquid; the last two zones are separated from each other by gas-proof intermediate bottoms, through which discharge ducts are made to pass. The arrangement is so devised that an intermingling of the different product flows entering and leaving certain zones will only take place to a slight extent in the discharge ducts. In the bottom portion of the adsorption zone of the column there is an inlet for the hydrocarbon mixture to be separated and for an inert carrier gas, whereas above the adsorption zone there is an exit for the inert carrier gas and for the passage of the unadsorbed portion of the hydrocarbon mixture; below the rinsing zone, there is another inlet, which serves for inert rinsing gas, which entrains undesirable hydrocarbons, and in the desorption zone an inlet is provided for desorbent, and on top an outlet for desorbed material. It is a further feature of the invention that above the lowermost intermediate bottom of the column, an admission for feed gas is arranged which controls the circulating amount of the adsorbent. It is another element of the invention that no intermediate bottom is arranged between rinsing zone and adsorption zone.

The invention will be more fully described with reference to the accompanying drawing which shows schematically in longitudinal section one embodiment of the apparatus according to the invention.

The apparatus comprises a vertical column 1 operating on the counter-current principle and containing several operational zones arranged vertically above each other.

The zones are designated by 2, which is the adsorption zone, 3 indicating the rinsing zone, and 4 the desorption zone; the adsorbent exit zone is designated by 5, the adsorbent inlet zone by 7. Within the several zones, traverse bottoms 8a to 8f are arranged, which are permeable for gas, but which prevent the passage of solid adsorbent therethrough. Gas impermeable bottoms 10a and 10b are furthermore provided between rinsing and desorption zone, and between the latter and the adsorbent exit zone. A third gas impermeable bottom 10c is arranged at the bottom of column 1. A number of short ducts 9 mounted in the permeable bottoms 8, and connecting tubes 11a, 11b and 11c are provided, the purpose of which will be explained below. A gas inlet 16 and an outlet 18 at opposite ends of column 1 serve for admission and discharge of carrier gas respectively. A conduit 20 branching off from column 1 serves for the upward travel of carrier gas admitted at 16 and adsorbents collected on bottom 10c. 17 designates a cyclone device. Other inlets are: 15 for the desorbent, 12 for the product to be separated, 19 for the rinsing gas and a cock 21 serves for shutting off admission of rinsing gas in some cases. Discharge openings are 13 for the desorbed product and the desorbent, and 14 for unadsorbed product with rinsing gas.

The apparatus operates as follows:

The hydrocarbons mixture to be separated is introduced into the column 1 together with a small amount of carrier gas between rinsing zone 3 and adsorption zone 2 through inlet 12, arriving from a source (not shown) where it has been heated to a temperature of 300–500° C. A small amount of rinsing gas is passed upwardly through the perforate bottom 8c arranged below inlet 12. The mixture then passes through the adsorption zone 2 filled with a selective zeolitic adsorbent which enters the adsorption zone 2 at the top of column 1 from conduit 20 by way of cyclone 17 and moves downwardly in counter-current to the hydrocarbon mixture from which it adsorbs the components capable of adsorption. The movement of the adsorbent is brought about by gravity flow similar to that of a liquid. The unadsorbed product and the small amount of rinsing gas mixed therewith leaves the adsorption zone through outlet 14. The adsorbent descends through tube 11a from zone 2 to the rinsing zone 3.

While the hydrocarbons to be adsorbed penetrate into the pores of the adsorbent, an undesired superficial adsorption of other hydrocarbons takes place simultaneously and these are removed in the rinsing zone 3 by inert carrier gas entering the rinsing zone through inlet 19.

The rinsing zone is optional. It may be dispensed with when the superficial adsorption of undesired hydrocarbons is negligible and their presence technically harmless. In that case, cock 21 will be turned to shut off the admission of rinsing gas and the adsorbent descends unchanged through the zone to the desorption zone.

The adsorbent, which is only charged with desirable hydrocarbons, flows through pipe 11b into the desorption zone 4, which is separated from the rinsing zone 3 by the solid bottom 10a. The desorbent admitted at 15 may consist of a low molecular n-paraffin or a polar compound which displaces the hydrocarbons from the pores and they leave the desorption zone together with the desorbent by exit 13. Adsorbent free of adsorbed hydrocarbons, leaves the desorption zone 4 through tube 11c and arrives in adsorbent exit zone 5. The transverse bottom 8f arranged in the zone 5 serves as a lid barring the zone from zone 4. There, the solid adsorbent is collected and is subsequently transported by carrier gas entering at 16 through the discharge duct 9 to the conduit 20 where it is lifted upwardly and transported the length of the entire conduit to adsorbent inlet zone 7, which it enters by way of the cyclone 17. Separation will occur at this point from carrier gas, which leaves the apparatus through an exit duct 18.

The adsorbent continues to travel to the uppermost bottom 8a in the adsorption zone and thus the cycle is closed.

While the solid adsorbent travels upwardly through conduit 20, there is the possibility of branching off part of the consumed adsorbent and feeding fresh adsorbent into the cycle, an embodiment of operation which is not shown in the drawing but clearly understandable to the skilled operator.

The apparatus according to the invention offers the opportunity of separating certain hydrocarbons of a mixture of desired hydrocarbons, which are adsorbed by a special synthetic zeolite, from hydrocarbon fractions containing the same, with a simple apparatus thereby reducing the expense of recovery methods hitherto in use. There is the added advantage of lowering the consumption of selective adsorbent, and of limiting the space needed for setting up the equipment used according to the invention.

The invention will now be further illustrated by reference to the following example.

A hydrogen mixture to be separated contains:

| | Volume percent |
|---|---|
| Paraffins and naphthenes | 81.7 |
| Aromatics | 16.7 |
| Olefins | 1.6 |

Of this mixture, 4.45 kgs. are admitted per hour at the inlet 12 of column 1, together with 1.52 kgs. of carrier gas. Further admitted is 0.76 kg. of rinsing gas. Both carrier gas and rinsing gas are rich in hydrogen.

The adsorbents serving for the separation of the hydrocarbons is a synthetic zeolite of the type 5A having a pore size of 5A. It is admitted at the top of the column in an amount of 20 kg. per hour in order to afford adequate separation and purity of the desorbed product. The pressure is maintained in all zones throughout the device at 10 atm., the temperature at 380° C.

After having passed through zone 2, the adsorbents and the hydrocarbons adsorbed thereon reach the rinsing zone 3, where rinsing gas is admitted at inlet 19, which is later withdrawn at outlet 14. After having passed through zone 3, the mixture descends to the desorption zone, where desorbents is admitted at inlet 15 in an amount of 8.9 kg. per hour. The desorbents in this case consists of n-pentane. The desorbent and the hydrocarbons contained therein leave the zone at 13. The amount of desorbed i.e. pure hydrocarbons is 0.76 kg. per hour consisting of

| | Vol. percent |
|---|---|
| Straight-chain paraffins $C_{10}$–$C_{14}$+naphthenes | 99.1 |
| Aromatics | 0.4 |
| Olefins | 0.5 |

The amount of desorbent withdrawn is 7.9 kgs. per hour. The product eliminated at 14 consists of 3.69 kgs. per hour of a hydrocarbon mixture containing

| | Vol. percent |
|---|---|
| Paraffins+naphthenes | 78.2 |
| Aromatics | 20.0 |
| Olefins | 1.8 |

Carrier gas and rinsing gas are likewise withdrawn at 14 in the same amounts as admitted. Also withdrawn there is 1 kg. desorbent.

The hydrocarbons withdrawn together with the rinsing gas are separated from the gas in an aftertreatment, whereupon the rinsing gas is returned into the operating cycle. The carrier gas is also re-cycled.

As mentioned before, the rinsing step can be omitted in some cases, when the amount of undesired hydrocarbons adsorbed on the zeolite is negligible, or the flow of hydrocarbons is modified by an adjustment of the gas pressure in the system.

While in the above example, the invention has been described for the separation of a given mixture of hydrocarbons, it should be understood that the principle is applicable for any mixture in gas form which can be separated selectively by adsorption into several components or portions of the mixture.

What is claimed is:

1. A column for the continuous separation of hydrocarbons by selective adsorption with a zeolite-type adsorbent moving downward in counter-current with the ascending, gaseous or vaporous hydrocarbons, the column comprising in superposition an adsorbent inlet zone, an adsorption zone, a rinsing zone, a desorption zone and an adsorbent exit zone; solid gas permeable adsorbent impermeable transverse bottoms mounted within said zones and ducts connecting said bottoms for the passage of adsorbent in liquid-like flow; gas-impermeable bottoms arranged between the rinsing and desorption zones, and the desorption and adsorbent exit zones with discharge passages mounted therebetween which permit only a minimum of intermingling between streams of incoming and exiting products; the column further comprising inlets for rinsing gas, inlets and outlets for the hydrocarbon mixture, and for the adsorbent and the desorbent and means for returning the adsorbent from the bottom end to the top end of the column for continuous operation.

2. The column according to claim 1 which further comprises at the bottom an inlet for admission of inert carrier gas under pressure for controlling the amount of adsorbent to be returned into the process, and pipe means for said return passage of the adsorbent to the top of the column.

3. The column according to claim 1, wherein the rinsing zone and the adsorption zone form a continuous passage for the gaseous hydrocarbon products in mixture with the rinsing gas.

References Cited

UNITED STATES PATENTS

| 2,609,887 | 9/1952 | Berg | 55—79 |
| 2,717,694 | 9/1955 | Pansing et al. | 55—79 |
| 2,719,206 | 9/1955 | Gilmore | 55—390 |
| 2,850,114 | 9/1958 | Kehde et al. | 55—79 |
| 2,921,970 | 1/1960 | Gilmore | 55—79 |
| 2,639,973 | 5/1953 | Fritz | 55—77 |

REUBEN FRIEDMAN, Primary Examiner

C. N. HART, Assistant Examiner

U.S. Cl. X.R.

55—390